(12) United States Patent
Kasai et al.

(10) Patent No.: US 6,988,383 B2
(45) Date of Patent: Jan. 24, 2006

(54) BUSHING AND GLASS FIBER PRODUCING METHOD (75) Inventors: Shin Kasai, Fukushima (JP); Yasushi Miura, Fukushima (JP)

(73) Assignee: Nitto Boseki Co., Ltd., Fukushuma (JP)

( * ) Notice: Subject to any disclaimer, the term of this patent is extended or adjusted under 35 U.S.C. 154(b) by 473 days.

(21) Appl. No.: 10/221,499

(22) PCT Filed: Mar. 13, 2001

(86) PCT No.: PCT/JP01/01969

§ 371 (c)(1),
(2), (4) Date: Sep. 13, 2002

(87) PCT Pub. No.: WO01/68543

PCT Pub. Date: Sep. 20, 2001

(65) Prior Publication Data

US 2003/0037574 A1 Feb. 27, 2003

(30) Foreign Application Priority Data

Mar. 14, 2000 (JP) .............................. 2000-070514

(51) Int. Cl.
*C03B 37/083* (2006.01)
(52) U.S. Cl. .......................................... 65/497; 65/475
(58) Field of Classification Search ................. 65/483, 65/495, 496, 497, 437, 401, 475

See application file for complete search history.

(56) References Cited

U.S. PATENT DOCUMENTS

| 3,802,857 | A | * | 4/1974 | Gerlach et al. ................ 65/492 |
| 4,119,420 | A | * | 10/1978 | Shono et al. ................. 65/496 |
| 4,318,724 | A | | 3/1982 | Kim et al. ......................... 65/1 |
| 4,379,713 | A | | 4/1983 | Eisenberg ......................... 65/1 |
| 4,380,462 | A | | 4/1983 | Shono et al. .................... 65/1 |
| 4,473,387 | A | * | 9/1984 | Lecron et al. ................ 65/496 |
| 4,482,370 | A | * | 11/1984 | Eisenberg .................... 65/496 |
| 6,044,666 | A | * | 4/2000 | Burger et al. ................. 65/492 |
| 6,543,258 | B1 | * | 4/2003 | Konno et al. ................. 65/497 |

FOREIGN PATENT DOCUMENTS

| FR | 2506288 | 11/1982 |
| JP | 56-84335 | 7/1981 |
| JP | 57-34038 | 2/1982 |
| JP | 11-43343 | 2/1999 |
| JP | 2000-103635 | 4/2000 |
| JP | 2000-335932 | 12/2000 |
| JP | 2000-344541 | 12/2000 |
| WO | WO 99/28543 | 6/1999 |

* cited by examiner

*Primary Examiner*—Steven P. Griffin
*Assistant Examiner*—Carlos Lopez
(74) *Attorney, Agent, or Firm*—Morgan, Lewis & Bockius LLP (57) ABSTRACT

The present invention provides a bushing (10) having a glass outlet portion (18) in which two nozzle holes (12) of substantially flat shape are arranged, and permitting molten glass to be drawn out of the nozzle holes (12), and the bushing is provided with a concomitant flow guide (20) for guiding a concomitant flow made with drawing of the molten glass out of the nozzle holes (12), to between the nozzle holes (12).

12 Claims, 7 Drawing Sheets

BUSHING AND GLASS FIBER PRODUCING METHOD

TECHNICAL FIELD

The present invention relates to a bushing for spinning flat glass fibers of a flat cross section.

BACKGROUND ART

There are the known flat glass fibers of the flat cross section as glass fibers used in nonwoven glass fiber fabric and others. When nonwoven fabric is made by paper making of the flat glass fibers, the flat glass fibers overlap each other with their longitudinal directions being horizontal, which can increase the bulk density of the nonwoven fabric and which can provide the nonwoven fabric with high strength by binding with a small amount of a binder. For these reasons, attention is recently being given to the technology of forming the nonwoven glass fiber fabric using the flat glass fibers.

In general, the glass fibers are produced by an operation of retaining molten glass in a melting furnace equipped with a bushing and drawing the molten glass out of nozzle holes formed in the bushing. The aforementioned flat glass fibers can be produced by drawing the molten glass out through the nozzle holes of flat shape.

DISCLOSURE OF THE INVENTION

However, the conventional bushings had the following problem. Namely, the bushings often had two juxtaposed nozzle holes and this arrangement raised the problem that during the spinning work of glass fibers, molten glass streams from the adjacent nozzle holes came into contact to join each other. If the molten glass streams unintentionally join each other, the spinning work of glass fibers must be suspended, which would cause serious harm in the production process.

When the spinning work of glass fibers is once suspended, the molten glass streams drawn out of the adjacent nozzle holes tend to join each other, and there are desires for separating the joining molten glass streams readily.

Further, there was another problem that the molten glass streams of flat shape drawn out of the nozzle holes of an oval cross section decreased their flatness because of surface tension acting on the molten glass itself, so as to become circular in cross section.

The present invention has been accomplished under the above-stated circumstances and an object of the invention is to provide a bushing and a glass fiber producing method by which the molten glass streams drawn out of the two juxtaposed nozzle holes are prevented from readily joining each other during the spinning work, by which the joining molten glass streams can be readily separated from each other, and by which decrease is prevented in the flatness of flat glass fibers.

In order to achieve the above object, the present invention provides a bushing comprising a glass outlet portion in which two nozzle holes of substantially flat shape are juxtaposed, and permitting molten glass to be drawn out of the nozzle holes, the bushing comprising a concomitant flow guide for guiding a concomitant flow made with drawing of the molten glass out of the nozzle holes, to between the nozzle holes.

In the bushing according to the present invention, the concomitant flow made with drawing of the molten glass out of the nozzle holes is guided through the concomitant-flow-guide to between the nozzle holes. Therefore, the wind power of the concomitant flow prevents the molten glass streams drawn out of the respective nozzle holes from coming near to each other, so that the molten glass streams become unlikely to join each other during spinning. Even in the case where the molten glass streams join each other for some reason, e.g., because of suspension of the spinning work of glass fibers, the concomitant flow starts flowing by a restart of the spinning work to draw the molten glass out of the nozzle holes and this concomitant flow is guided through the concomitant flow guide to between the nozzle holes, whereby the joining molten glass streams can be readily separated from each other. Further, the concomitant flow cools the molten glass drawn out of the nozzle holes. This increases the viscosity of the molten glass to solidify it before the flatness thereof decreases because of the surface tension. Therefore, glass fibers can be made with high flatness.

In the bushing of the present invention, preferably, a plurality of glass outlet portions are arranged in a direction perpendicular to a juxtaposition direction of the two nozzle holes, and the concomitant flow guide extends in the arrangement direction of the glass outlet portions and has a discharge portion for discharging the concomitant flow between the nozzle holes.

In this configuration, the concomitant flow is discharged from the discharge portion of the concomitant flow guide to be efficiently directed to the molten glass drawn out of the nozzle holes.

A glass fiber producing method of the present invention is a method of, using a bushing comprising a glass outlet portion in which two nozzle holes of substantially flat shape are juxtaposed, drawing molten glass out of the nozzle holes to spin glass fibers, wherein during drawing of the molten glass out of the nozzle holes, a concomitant flow made with drawing of the molten glass is guided to between the nozzle holes.

In the glass fiber producing method according to the present invention, the concomitant flow is guided to between the nozzle holes during the drawing of molten glass out of the nozzle holes, and the wind power of the concomitant flow prevents the molten glass streams drawn out of the nozzle holes from coming near to each other. Therefore, the molten glass streams become unlikely to join each other. Even in the case where the molten glass streams join each other for some reason, e.g., because of suspension of the spinning work of glass fibers, the concomitant flow starts flowing by a restart of the spinning work to draw the molten glass out of the nozzle holes, and this concomitant flow is guided through the concomitant flow guide to between the nozzle holes, whereby the molten glass streams can be readily separated from each other. Further, the concomitant flow cools the molten glass drawn out of the nozzle holes. This increases the viscosity of the molten glass to solidify it before the flatness thereof decreases because of the surface tension, and thus glass fibers can be made with high flatness.

BEST MODE FOR CARRYING OUT THE INVENTION

The preferred embodiments of the bushing and the glass fiber producing method according to the present invention will be described below in detail with reference to the accompanying drawings. The same reference symbols will denote the same elements and redundant description will be omitted.

Figure 1:
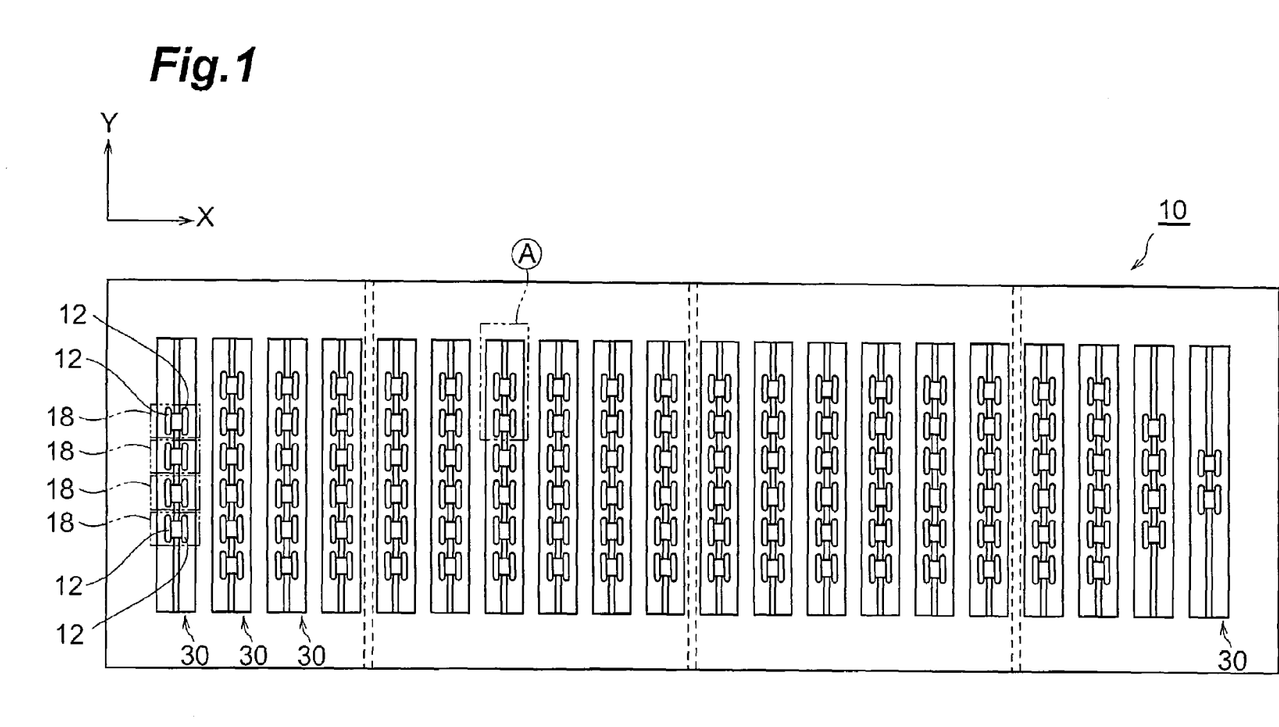
FIG. 1 is a bottom view showing a bushing of the present invention.
Figure 2:
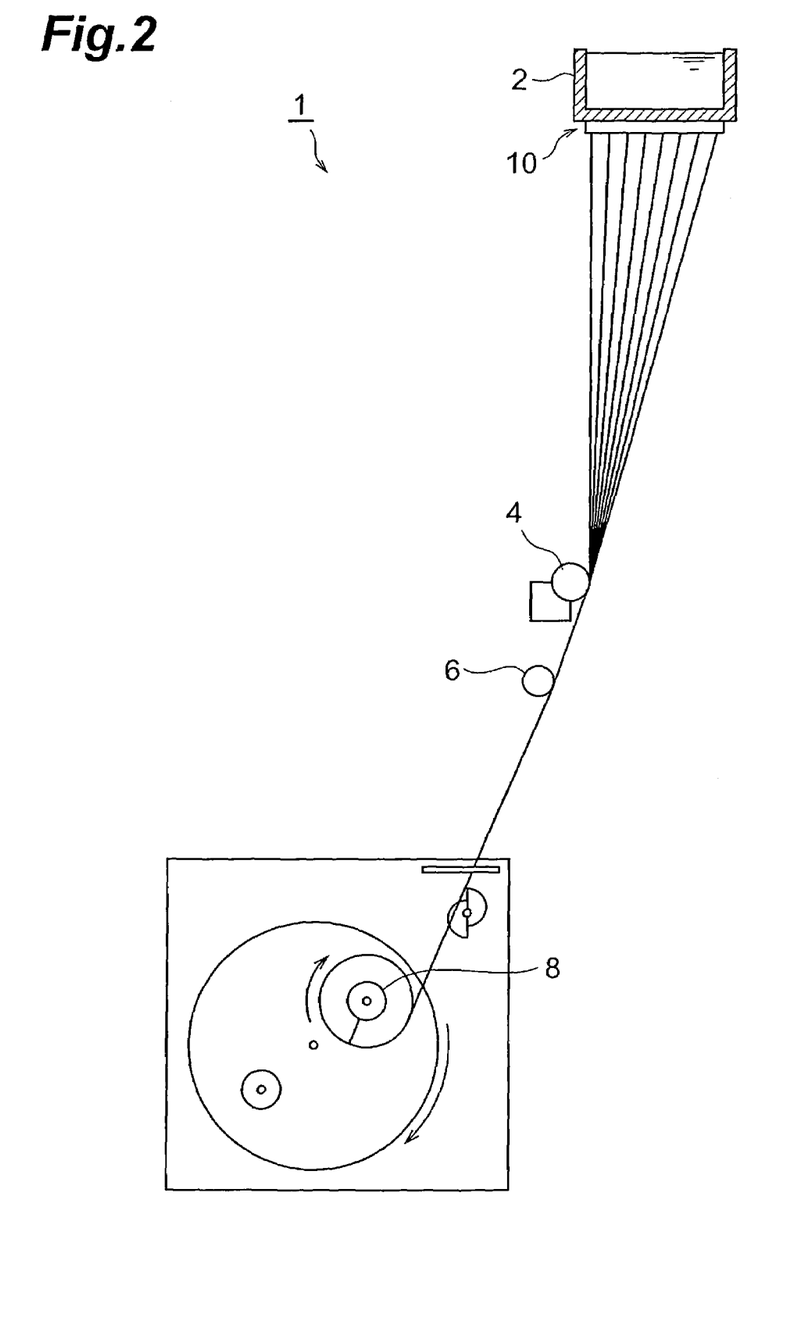
FIG. 2 is a schematic illustration showing a glass fiber producing system using the bushing shown in FIG. 1.

FIG. 1 is a bottom view showing the bushing 10 of the present embodiment, and FIG. 2 a schematic illustration showing a glass fiber producing system 1 for producing glass fibers, using the bushing 10 shown in FIG. 1.

First, the entire glass fiber producing system 1 will be described referring to FIG. 2. The glass fiber producing system 1 is provided with a melting furnace 2 equipped with the bushing 10 on the bottom surface and retaining molten glass therein, and streams of the molten glass spun through the nozzle holes of the bushing 10 are cooled into filaments. The filaments spun from the bushing 10 of the present embodiment have a cross section of flat shape, which will be detailed later. Further, a binder applying roller 4 is located below the bushing 10, and this binder applying roller 4 applies a binder onto the filaments. The filaments coated with the binder are gathered into a strand by a gathering roller 6, thus obtaining a long glass fiber. After that, the strand is wound up onto a rotary drum 8 to obtain a so-called cake. The above described the structure of the glass fiber producing system 1.

The structure of the bushing 10 of the present embodiment will be detailed below with reference to FIGS. 1, and 3 to 5. As shown in FIG. 1, the bushing 10 is provided with glass outlet portions 18 in each of which nozzle holes 12 having a cross section of flat shape are juxtaposed with their longitudinal directions parallel to each other. A plurality of such glass outlet portions 18 are arranged in a direction (Y-direction) perpendicular to the juxtaposition direction (X-direction in FIG. 1) of the nozzle holes 12, to form a nozzle block row 30. Further, in the bushing 10, a plurality of such nozzle blocks 30 are arranged in the X-direction.

Figure 3:
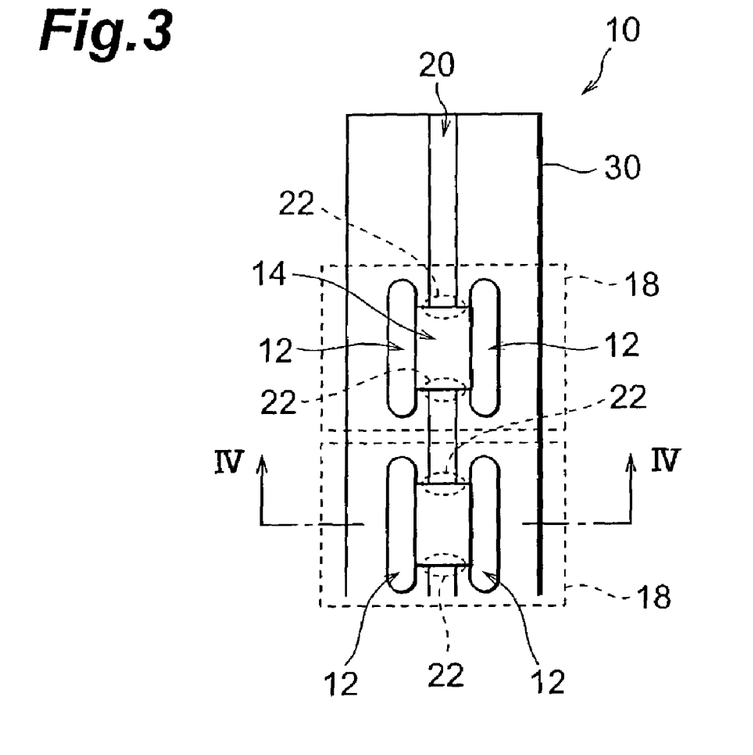
FIG. 3 is an enlargement of a region surrounded by a chain double-dashed line A in the bushing shown in FIG. 1.
Figure 4:
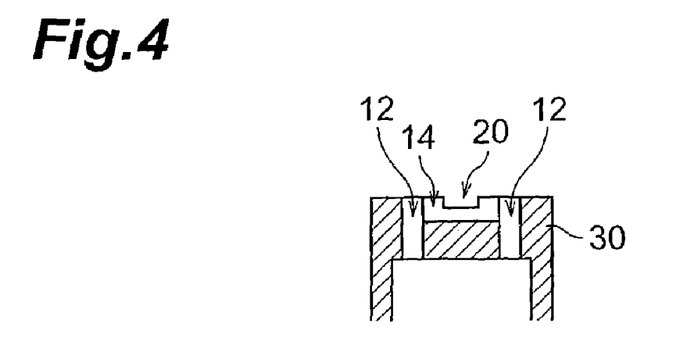
FIG. 4 is a sectional view along a direction IV—IV in FIG. 3.
Figure 5:
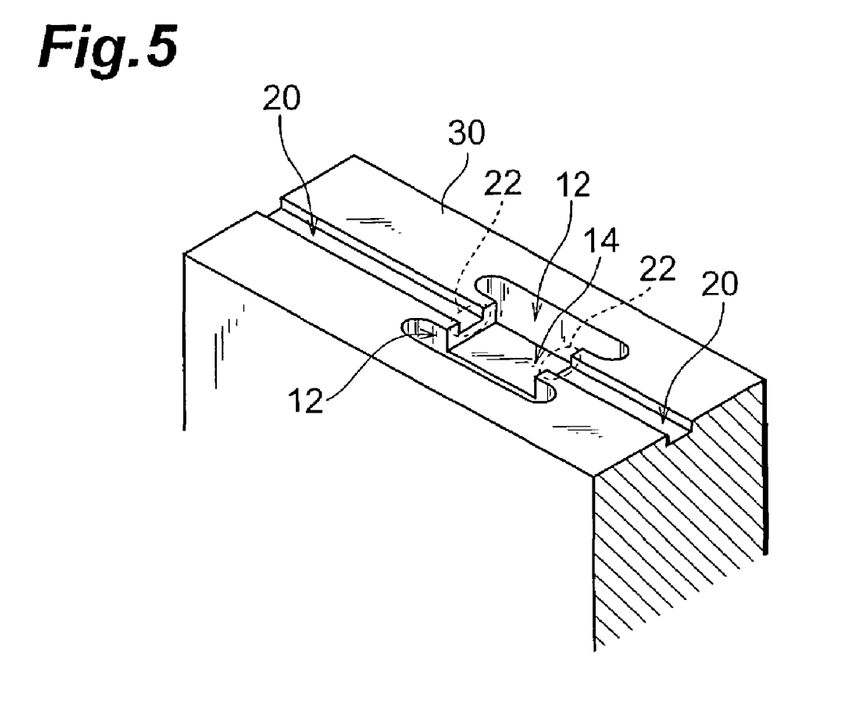
FIG. 5 is a perspective view showing a characteristic part (glass outlet portion) of the bushing of the present invention.

FIG. 3 is an enlargement of a region surrounded by a chain double-dashed line A in the bushing 10 shown in FIG. 1, FIG. 4 a sectional view along the direction IV—IV in FIG. 3, and FIG. 5 an enlarged perspective view of a glass outlet portion 18 shown in FIG. 3. As shown in FIGS. 3 to 5, a recess 14 bored in rectangular parallelepiped shape is formed between the nozzle holes 12, and a concomitant flow guide 20 of channel shape extends along the longitudinal direction of the nozzle holes 12.

The concomitant flow guide 20 extends along the arrangement direction of the glass outlet portions 18 (cf. FIG. 3) and has discharge portions 22 for discharging the concomitant flow to between the nozzle holes 12, i.e., toward the recess 14. The concomitant flow stated herein refers to wind flowing with drawing of molten glass out of the nozzle holes 12. As shown in FIG. 5, the concomitant flow guide 20 extends up to the ends of the nozzle block 30 and the sectional shape thereof is an indent form having edges.

Figure 6:
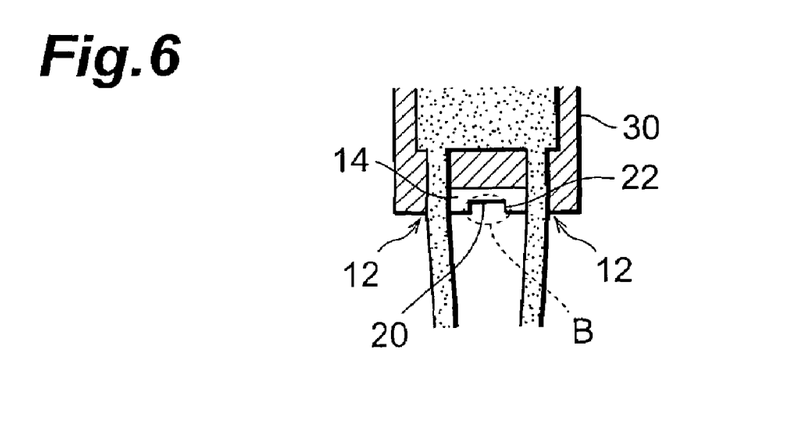
FIG. 6 is a view used for explaining the action of the bushing during the drawing work of molten glass out of nozzle holes.

The action of the bushing 10 of the present embodiment will be described below with reference to FIGS. 6 and 7. First, the action during spinning of glass fibers will be described with reference to FIG. 6. The concomitant flow runs in the concomitant flow guide 20 during the operation of drawing the molten glass in the melting furnace 2 (cf. FIG. 2) out of the nozzle holes 12 with rotation of the rotary drum 8. Describing it in more detail, the concomitant flow runs, for example, from that side to this side in the drawing in the region indicated by a dashed line B to flow efficiently from the discharge portion 22 of the concomitant flow guide 20 into the recess portion 14 between the nozzle holes 12. For this reason, the wind power of the concomitant flow prevents the molten glass streams drawn out of the nozzle holes 12 from coming near to each other, so that the molten glass streams become unlikely to join each other during the spinning.

Since the nozzle holes 12 are of the flat shape, the molten glass streams drawn out of the nozzle holes 12 are of flat shape similar to the shape of the nozzle holes 12 immediately after drawn. In the conventional technology, however, the molten glass streams thus drawn decreased their flatness because of the surface tension and the cross section of glass fibers tended to become closer to a circle. In contrast to it, in the present embodiment the concomitant flow guided to the nozzle holes 12 cools the molten glass drawn out of the nozzle holes, so that the molten glass increases its viscosity to solidify before the decrease of the flatness due to the surface tension. For this reason, glass fibers can be made with high flatness.

Figure 7A:
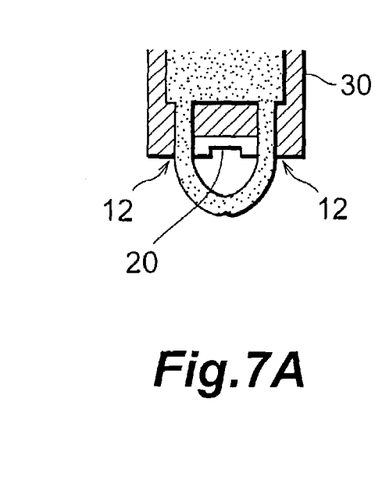
FIGS. 7A to 7D are illustrations showing a process of separating joining molten glass streams.
Figure 7B:
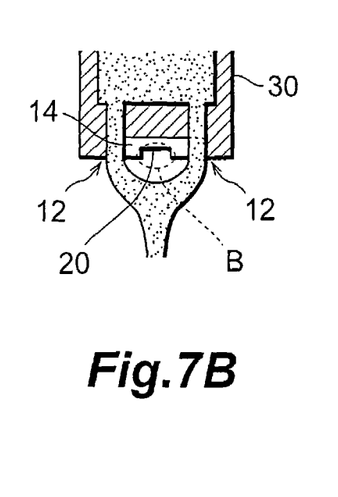
Figure 7C:
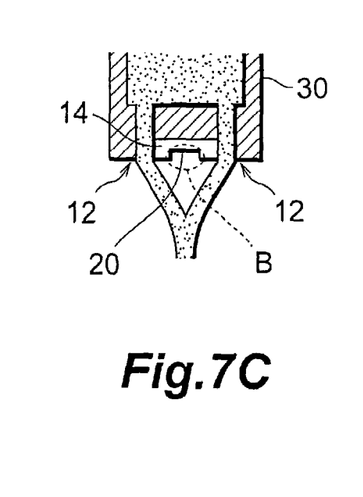
Figure 7D:
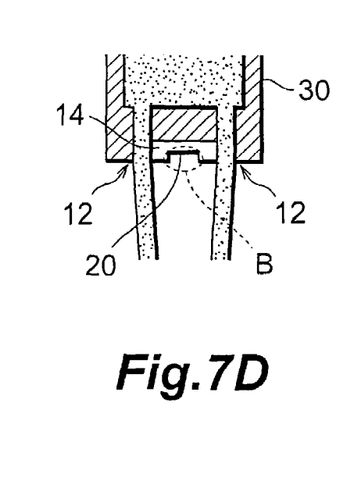

The following will describe the action of the bushing 10 after suspension of the spinning work of glass fibers with reference to FIGS. 7A to 7D. When the rotary drum is brought into a standstill to suspend the spinning work of glass fibers, no concomitant flow is made, so that the molten glass streams drawn out of the adjacent nozzle holes 12 come to join each other, as shown in FIG. 7A. The joining of molten glass streams occurs for the following reason: since the recess portion 14 has been cooled, the temperature decreases at inside portions of the adjacent molten glass streams and thus the viscosity increases at those portions. When the spinning work is restarted to begin drawing molten glass streams out of the nozzle holes 12, as shown in FIG. 7B, the concomitant flow starts running through the concomitant flow guide 20 into the recess portion 14 between the nozzle holes 12 in the region B. Then, as shown in FIG. 7C, the joining molten glass streams start being gradually separated by the wind power of the concomitant flow, and the molten glass streams drawn out of the adjacent nozzle holes 12 are finally separated completely from each other, as shown in FIG. 7D. With the bushing 10 of the present embodiment, the joining molten glass streams can be readily separated from each other by simply drawing the molten glass out of the nozzle holes 12, as described above.

Figure 8:
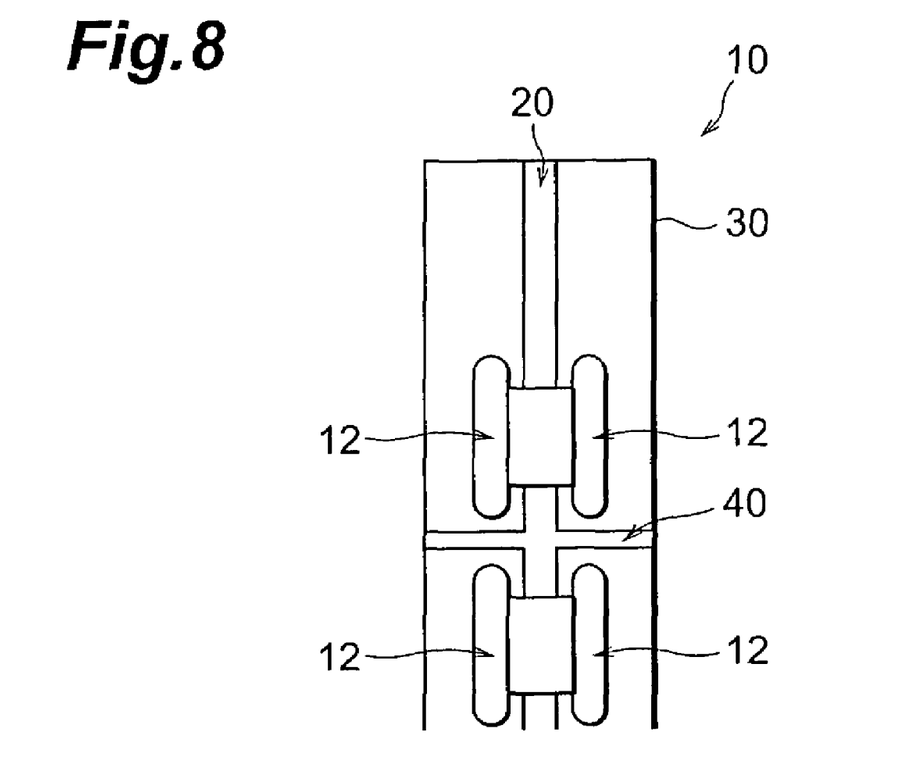
FIG. 8 is an illustration showing a modification example of the bushing according to the present invention.

The following will describe a modification example of the bushing of the present embodiment with reference to FIG. 8. As shown in the same figure, the bushing of the present modification is provided with a concomitant flow guide 40 extending in the juxtaposition direction of the adjacent nozzle holes 12, in addition to the concomitant flow guide 20 extending in the longitudinal direction of the nozzle holes 12. In this configuration, the concomitant flow runs from sides of the nozzle block 30 through the concomitant flow guide 40 into the concomitant flow guide 20 during the drawing of molten glass out of the nozzle holes 12. This permits a greater volume of concomitant flow to be guided to between the nozzle holes 12, which further enhances the effect of preventing the aforementioned joining of molten glass streams, the effect of separating the joining molten glass streams from each other, and the effect of preventing the decrease in the flatness of flat glass fibers.

Figure 9A:
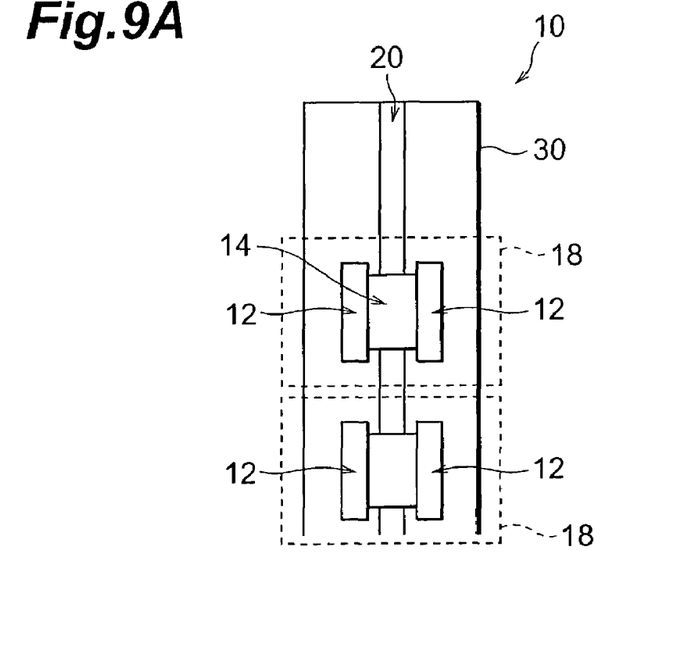
FIGS. 9A and 9B are illustrations showing other modification examples of the bushing according to the present invention.
Figure 9B:
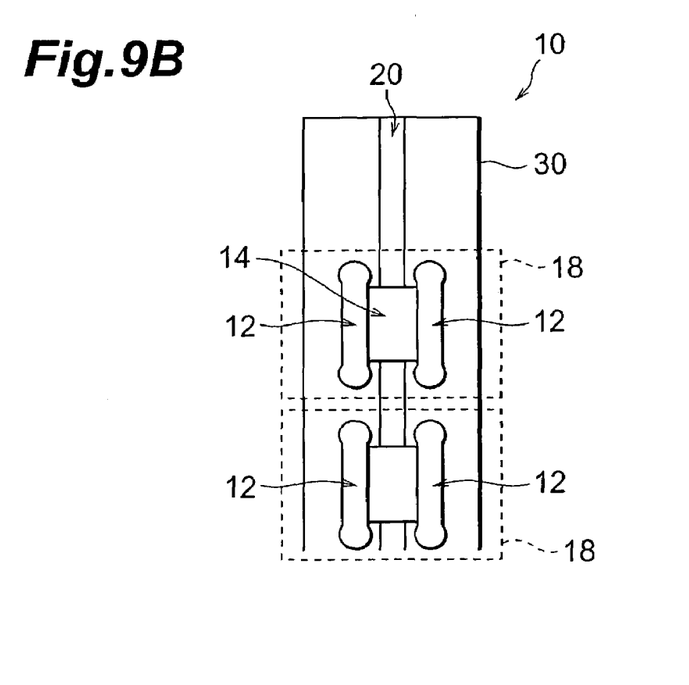

Other modification examples of the bushing of the present embodiment will be described with reference to FIGS. 9A and 9B. The bushings shown in FIGS. 9A and 9B are different in the shape of nozzle holes 12 from the aforementioned embodiment. In the modification shown in FIG. 9A, the nozzle holes 12 are rectangular, and in the modification shown in FIG. 9B, the nozzle holes 12 are of such dumbbell shape as combination of a rectangle with circles at the both ends thereof. When the nozzle holes 12 are of such flat shape, the glass fibers can also be made in the flat section.

The above specifically described the invention accomplished by the inventors, on the basis of the embodiments thereof, but it should be noted that the present invention is by no means limited to the above embodiments. For example, the sectional shape of the concomitant flow guide does not always have to be one with two edges, but it can be one of various modifications, e.g., a semicircle, a triangle, and so on.

INDUSTRIAL APPLICABILITY

In the bushing and the glass fiber producing method according to the present invention, as described above, the concomitant flow made with drawing of molten glass out of the nozzle holes is guided through the concomitant flow guide to between the nozzle holes. For this reason, the wind power of the concomitant flow prevents the molten glass streams drawn out of the nozzle holes from coming near to each other, so that the molten glass streams become unlikely to join each other during the spinning work. Even in the case where the molten glass streams join each other because of suspension of the spinning work of glass fibers or the like, the concomitant flow again starts running with a restart of the spinning work to draw the molten glass out of the nozzle holes, and this concomitant flow is guided through the concomitant flow guide to between the nozzle holes, whereby the joining molten glass streams can be readily separated from each other. Further, the molten glass streams drawn out of the nozzle holes are cooled by the concomitant flow. For this reason, the molten glass increases its viscosity to solidify before the decrease of flatness due to the surface tension, so that glass fibers can be made with high flatness.

What is claimed is:

1. A nozzle block comprising:
  a plurality of glass outlet portions arranged in a first direction, each of the glass outlet portions having:
    two nozzle holes of substantially slit shape extending in the first direction, the nozzle holes being juxtaposed in a second direction that is at least substantially orthogonal with respect to the first direction; and
    a recess provided between the nozzles holes, the recess communicating with the nozzle holes; and
  a channel extending in the first direction and passing between the nozzle holes of each of the glass outlet portions, the channel communicating with the recess of each of the glass outlet portions.

2. The nozzle block according to claim 1, wherein the nozzle holes are configured to pass molten glass streams drawn out of the nozzle holes that are of a flat shape similar to the shape of the nozzle holes immediately after being drawn.

3. The nozzle block according to claim 1, wherein the substantially slit shape is a rectangular shape.

4. The nozzle block according to claim 1, wherein the substantially slit shape is a dumbbell shape.

5. The nozzle block according to claim 1, wherein the channel comprises a concomitant flow guide having discharge portions for discharging a concomitant flow to the recesses for preventing molten glass streams drawn out of the nozzle holes from approaching one another to thereby decrease the likelihood of the molten glass streams from joining one another during spinning.

6. The nozzle block according to claim 5, wherein the concomitant flow comprises air flowing with drawing of molten glass out of the nozzle holes.

7. The nozzle block according to claim 1, wherein the channel comprises a concomitant flow guide having discharge portions for discharging a concomitant flow to the recesses for cooling molten glass streams drawn out of the nozzle holes so that the molten glass increases its viscosity to solidify before a substantial decrease of flatness in the molten streams that would otherwise result from surface tension.

8. The nozzle block according to claim 7, wherein the concomitant flow comprises air flowing with drawing of molten glass out of the nozzle holes.

9. A bushing comprising a plurality of nozzle blocks each configured in accordance with the nozzle block recited in any one of claims 4 through 8, wherein the plurality of nozzle blocks are juxtaposed in the second direction.

10. A glass fiber producing method comprising:
  preparing the nozzle block configured in accordance with any one of claims 1 through 8;
  drawing molten glass out of the nozzle holes of the glass outlet portions of the nozzle block; and
  guiding air between the nozzle holes of each of the glass outlet portions through the channel and the recesses.

11. The method of claim 10, wherein the guiding of air causes molten glass of molten glass streams drawn out of the nozzle holes to increase its viscosity to solidify before a substantial decrease of flatness in the molten streams that would otherwise result from surface tension.

12. The method of claim 10, wherein the guiding of air cools molten glass streams drawn out of the nozzle holes so that the molten glass increases its viscosity to solidify before a substantial decrease of flatness in the molten streams that would otherwise result from surface tension.

* * * * *